Jan. 30, 1945.  F. E. NEEF, JR  2,368,261
METHOD OF REMOVING DYE AND TETRAETHYL LEAD FROM GASOLINE
Filed April 16, 1943
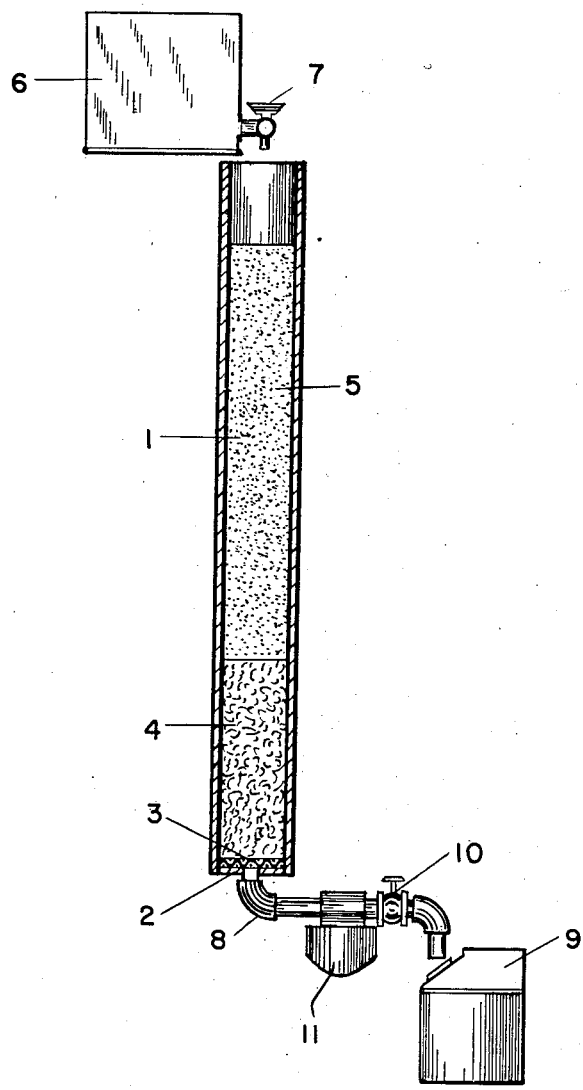
INVENTOR
FREDERICK E. NEEF, JR.
BY
ATTORNEYS

UNITED STATES PATENT OFFICE 2,368,261

METHOD OF REMOVING DYE AND TETRA-
ETHYL LEAD FROM GASOLINE

Frederick E. Neef, Jr., Detroit, Mich.

Application April 16, 1943, Serial No. 483,348

3 Claims. (Cl. 196—39)

(Granted under the act of March 3, 1883, as
amended April 30, 1928; 370 O. G. 757)

The invention described herein may be manufactured and used by or for the Government for governmental purposes, without the payment to me of any royalty thereon.

The present invention pertains to a novel method of and apparatus for removing dye and tetraethyl lead from gasoline.

An army in the field, or other expedition, requires gasoline for cook stoves, blow torches, Bunsen burners, sterilizers, and for the cleaning of various machine parts. Under such conditions, untreated colorless gasoline may not be available and it becomes necessary to use the colored leaded motor fuel. The use of such fuel for the purposes described, however, is unsafe. The products of combustion of leaded gasoline present a health hazard inasmuch as they are injurious when inhaled and are likely to poison food when the gasoline is used in a stove. Also, in connection with a stove, the leaded gasoline clogs the apertures of the burners in time. Further, the handling of gasoline in washing and cleaning various articles is injurious to the skin.

The object of this invention is to provide a novel means of filtering the dye and the lead compound out of motor gasoline. This is accomplished by the use of clay activated by heating or by treatment with hydrochloric or sulfuric acid. The chemical activation is the more effective, and one of the preferred forms of clay is hydrated aluminum silicate derived from naturally occurring bentonites.

The removal of the lead compound is not a mere mechanical operation, since the compound is in solution, but rather the result of a chemical reaction with the filter.

The invention is fully disclosed by way of example in the following description and in the accompanying drawing in which the single figure is a vertical section of a simple installation.

The filter may be built within a tube or standard pipe designated by the numeral 1. An apertured plate 2 is fitted on the lower end, and a screen 3 is laid upon the plate. In the bottom of the tube and upon the screen is laid a quantity of cotton 4 and on this is the activated clay represented by the numeral 5. The purpose of the cotton is to hold back any particles of clay that might otherwise be carried downward by the fluid.

A suitable gasoline reservoir 6 is supported at the top of the tube 1 and is equipped with a valve 7 adjusted to drip the gasoline upon the clay. Into the apertured bottom plate 2 is fitted a suitable outlet pipe 8 leading to a container 9. The pipe 8 is fitted with a shut-off valve 10 and a settling filter 11 if desired.

As already indicated, the clay may be a hydrated aluminum silicate derived from naturally occurring bentonites and is activated by heating or by treatment with hydrochloric or sulfuric acid. Such a clay activated with sulfuric acid is sold under the trade name of Filtrol. Activated diatomaceous earth may also be used.

The leaded gasoline reacts chemically with the acid-activated clay. The compound thus formed, although as yet unidentified, is very stable, since the lead is retained with great tenacity by the filter. This is shown by the failure to remove any lead from the filter on treatment with absolute ethyl alcohol, or concentrated aqueous ammonia, or bromine and hot water, or by high-temperature vacuum distillation. The saturated filter has a pronounced odor and it should probably be considered as a hazardous material, to be disposed of by burning or burying.

Filtration by this means is capable of removing all of the dye and at least 95% of the lead compound. The quantity of filter and the time of contact are governed by the nature of the gasoline. For example, it is believed that unsaturated hydrocarbons combine with the filter and reduce its effectiveness as a filter. Consequently, a gasoline containing larger quantities of unsaturated hydrocarbons requires corresponding quantities of filter and an increased time of contact.

It will be understood that the invention is susceptible to modification by the substitution of equivalents as indicated by the appended claims.

What I claim is:

1. The method of removing dye and tetraethyl lead from gasoline consisting in passing the gasoline through clay activated with a mineral acid selected from the group consisting of sulphuric acid and hydrochloric acid.

2. The method of removing dye and tetraethyl lead from gasoline consisting in passing the gasoline through clay activated with sulfuric acid.

3. The method of removing dye and tetraethyl lead from gasoline consisting in passing the gasoline through hydrated aluminum silicate activated with sulfuric acid.

FREDERICK E. NEEF, Jr.